United States Patent
Cudak et al.

(10) Patent No.: US 11,637,750 B2
(45) Date of Patent: Apr. 25, 2023

(54) PROVIDING CONFIGURATION DATA TO A CONNECTED NETWORK SWITCH

(71) Applicant: Lenovo Enterprise Solutions (Singapore) Pte. Ltd., Singapore (SG)

(72) Inventors: Gary D. Cudak, Oxford, NC (US); Ronald F. Ridgeway, Jr., Holly Springs, NC (US); John M. Petersen, Wake Forest, NC (US); Alexander Verrigni, Cary, NC (US)

( * ) Notice: Subject to any disclaimer, the term of this patent is extended or adjusted under 35 U.S.C. 154(b) by 100 days.

(21) Appl. No.: 17/219,220

(22) Filed: Mar. 31, 2021

(65) Prior Publication Data
US 2022/0321411 A1 Oct. 6, 2022

(51) Int. Cl.
| | |
|---|---|
| G06F 15/173 | (2006.01) |
| H04L 41/084 | (2022.01) |
| H04L 41/0853 | (2022.01) |
| H04L 49/15 | (2022.01) |
| H04L 41/0873 | (2022.01) |
| H04L 41/0869 | (2022.01) |
| H04L 41/0663 | (2022.01) |
| H04L 41/082 | (2022.01) |
| H04L 41/0806 | (2022.01) |

(52) U.S. Cl.
CPC ...... *H04L 41/0846* (2013.01); *H04L 41/0663* (2013.01); *H04L 41/082* (2013.01); *H04L 41/0806* (2013.01); *H04L 41/0843* (2013.01); *H04L 41/0853* (2013.01); *H04L 41/0869* (2013.01); *H04L 41/0873* (2013.01); *H04L 49/15* (2013.01)

(58) Field of Classification Search
CPC ............. H04L 41/0846; H04L 41/0853; H04L 41/0869; H04L 41/0873; H04L 49/15
See application file for complete search history.

(56) References Cited

U.S. PATENT DOCUMENTS

2022/0253396 A1\* 8/2022 Chow ................. G06F 13/4068

FOREIGN PATENT DOCUMENTS

| CN | 105007169 A | \* | 10/2015 | ......... H04L 41/0806 |
| CN | 105472486 A | \* | 4/2016 | |
| CN | 105553855 A | \* | 5/2016 | ........... H04L 45/028 |
| CN | 106055834 A | \* | 10/2016 | ........... G06F 30/367 |

(Continued)

*Primary Examiner* — Richard G Keehn
(74) *Attorney, Agent, or Firm* — Jeffrey Streets; Streets Lawfirm (57) ABSTRACT

A computer program product and a network switch are provided. The network switch may include network ports, memory and a processor for processing program instructions to perform various operations. The computer program product may provide the program instructions for a network switch. The operations may include detecting a first neighbor network switch connection to a first port of the first network switch, accessing first neighbor network switch configuration data that is stored by the first network switch in association with the first port, and providing the configuration data that is stored in association with the first port of the first network switch to the first neighbor network switch over the first neighbor network switch connection to the first port. In one example, the configuration data is obtained from a second neighbor network switch that was previously connected to the first port prior to the first neighbor network switch.

20 Claims, 2 Drawing Sheets

(56) References Cited

FOREIGN PATENT DOCUMENTS

| | | | | | |
|---|---|---|---|---|---|
| CN | 107113219 | A | * | 8/2017 | ......... H04L 12/4645 |
| CN | 112039696 | A | * | 12/2020 | |
| EP | 2610750 | A1 | * | 7/2013 | .......... G06F 11/2092 |
| JP | H0832597 | A | * | 2/1996 | |
| JP | 2004147172 | A | * | 5/2004 | ............. H04L 12/42 |
| JP | 2006340161 | A | * | 12/2006 | ......... H04L 41/0806 |
| UA | 105438 | U | * | 3/2016 | |

* cited by examiner

PROVIDING CONFIGURATION DATA TO A CONNECTED NETWORK SWITCH

BACKGROUND

The present disclosure relates to a network switch and methods for configuring a network switch.

BACKGROUND OF THE RELATED ART

Network switches form a critical core of the infrastructure in data center operations. However, network switches may require maintenance or replacement over time and the data center may require additional network switches as the demands on the data center grow. Furthermore, some new rack solutions may even include their own network switch such that the new rack and its compute nodes may be added to an existing data center by connecting the rack switch to another switch within the existing data center.

Configuring these network switches, particularly in an enterprise production environment, requires careful consideration of numerous conditions and can be very challenging. Various uplink redundancy methods (Link Aggregation Group (LAG), Virtual Link Aggregation Group (VLAG), etc.) combined with routing, Virtual Local Area Networks (VLANs) and a myriad of settings and implications for all of those methods, must be considered for each port of the new network switch.

The challenges involved in configuring a new switch are applicable to both replacing a damaged switch with a new switch in an existing network and adding an additional switch to expand the existing network. Many of these same challenges are even applicable to the design and setup of brand new network solutions. In each of these scenarios, a new switch is being plugged into a switch that is already part of the existing network and there is often a need for technical assistance to resolve the complex nature of the challenges in configuring each new network switch.

BRIEF SUMMARY

Some embodiments provide a computer program product comprising a non-volatile computer readable medium and non-transitory program instructions embodied therein, the program instructions being configured to be executable by a processor of a first network switch to cause the processor to perform various operations. The operations may include detecting a first neighbor network switch connection of a first neighbor network switch to a first port of the first network switch, accessing first neighbor network switch configuration data that is stored by the first network switch in association with the first port, and providing the first neighbor network switch configuration data that is stored in association with the first port of the first network switch to the first neighbor network switch over the first neighbor network switch connection to the first port.

Some embodiments provide a network switch including a plurality of network ports including a first network port and a second network port, a non-volatile storage device storing program instructions, and a processor for processing the program instructions, wherein the program instructions are configured to, when processed by the processor, cause the processor to perform various operations. The operations may include detecting a first neighbor network switch connection of a first neighbor network switch to a first port of the first network switch, accessing first neighbor network switch configuration data that is stored by the first network switch in association with the first port, and providing the first neighbor network switch configuration data that is stored in association with the first port of the first network switch to the first neighbor network switch over the first neighbor network switch connection to the first port.

DETAILED DESCRIPTION

Some embodiments provide a computer program product comprising a non-volatile computer readable medium and non-transitory program instructions embodied therein, the program instructions being configured to be executable by a processor of a first network switch to cause the processor to perform various operations. The operations may include detecting a first neighbor network switch connection of a first neighbor network switch to a first port of the first network switch, accessing first neighbor network switch configuration data that is stored by the first network switch in association with the first port, and providing the first neighbor network switch configuration data that is stored in association with the first port of the first network switch to the first neighbor network switch over the first neighbor network switch connection to the first port.

In some embodiments, the operations may further include causing the first neighbor network switch to be configured with the first neighbor network switch configuration data that is provided by the first network switch to the first neighbor network switch over the first neighbor network switch connection to the first port. For example, the operations may include sending a configuration instruction to the first neighbor network switch such that the first neighbor network switch will subsequently configure itself with the first neighbor network switch configuration data received from the first network switch. In one option, the configuration instruction may cause the first neighbor network switch to execute an import command that identifies the configuration data that is to be applied by the first neighbor network switch.

In some embodiments, the operations may further include obtaining the first neighbor network switch configuration data from a second neighbor network switch that was connected to the first port of the first network switch and subsequently disconnected from the first port prior to the connection of the first neighbor network switch to the first port, and storing the obtained first neighbor network switch configuration data in association with the first port of the first network switch. For example, the first neighbor network switch may be a replacement for the second neighbor network switch. The replacement may occur due to a failure of the second neighbor network switch and it may be desired for the first neighbor network switch to be configured in the same manner as the second neighbor network switch. Accordingly, the first network switch obtains the first neighbor network switch configuration data from the second neighbor network switch while it is operational and stores the first neighbor network switch configuration data in association with the first port. Subsequently, when the second neighbor network switch is connected to the first port of the first switch, the first switch may automatically provide the configuration data that is needed to configure the second neighbor network switch in the same manner as the first neighbor network switch. Since the configuration can be automatically reapplied to the replacement switch, it is possible to avoid the time-consuming task of manually configuring the replacement switch.

In some embodiments, the configuration data may be stored in a non-volatile memory device within the first switch. The non-volatile memory device may be available to store configuration data for multiple neighbor network switches or the network switch may include multiple non-volatile memory devices that are each dedicated to a given port such that it stores only the configuration data for a single neighbor network switch that is connected to the given port. Because the neighbor network switch configuration data may be stored on a simple memory device, the data stored on the memory device may also be referred to as being "embedded." The memory device preferably includes non-volatile memory media, such as flash memory.

In some embodiments, the operations may further include sending a request for the first neighbor network switch configuration data of the second neighbor network switch over the first port to the second neighbor network switch. The second neighbor network switch may then transfer the first neighbor network switch configuration data to the first switch in response to the request. The request may be sent immediately upon detecting a connection to the first port or at any one or more point in time while the second neighbor network switch is connected to the first port. Optionally, the request may be sent periodically in order to update the stored copy of the first neighbor network switch configuration data. An updated or current copy of the configuration data will reflect any changes in the configuration of the second neighbor network switch that may have occurred since the previous capture of first neighbor network switch configuration data.

In some embodiments, the operations may further include accessing first network switch configuration data describing the configuration of the first network switch, and providing the first network switch configuration data to the first neighbor network switch. In a further option, the operations may further include causing the first neighbor network switch to store the first network switch configuration data in association with a port of the first neighbor network switch that is connected to the first port of the first network switch. In this manner, the first neighbor network switch stores the first network switch configuration data and may, if subsequently necessary, provide it to a new network switch that replaces the first network switch. It should be recognized that the present operations may be the reciprocal operations as described in other embodiments, such that any or all of the network switches in a computing system may perform in the same manner to both obtain the configurations of neighboring network switches to which is the network switch is connected and provide the configuration of the network switch to the neighboring network switches that are connected thereto. Therefore, it is possible that any network switch in the computing system may be replaced with a new network switch and the configuration of the network switch may be automatically transferred to the new network switch from a neighboring network switch in order to cause the new network switch to be configured the same as the network switch it is replacing.

In some embodiments, the operations may further include detecting a second neighbor network switch connection of a second neighbor network switch to a second port of the first network switch, accessing second neighbor network switch configuration data that is stored by the first network switch in association with the second port, and providing the second neighbor network switch configuration data that is stored in association with the second port to the second neighbor network switch over the connection to the second port. The network switch may perform operations and interact with multiple neighbor network switches connected to any or all of the ports of the first network switch in the same or similar manner. For example, the operations may further include causing the second neighbor network switch connected to a second port of the network switch to be configured with the second neighbor network switch configuration data that is stored in association with the second port. In a further example, the operations may further include obtaining the first neighbor network switch configuration data from a third neighbor network switch that was connected to the first port of the first network switch and subsequently disconnected from the first port prior to the connection of the first neighbor network switch to the first port, storing the obtained first neighbor network switch configuration data in association with the first port of the first network switch, obtaining the second neighbor network switch configuration data from a fourth neighbor network switch that was connected to the second port of the first network switch and subsequently disconnected from the second port prior to the connection of the second neighbor network switch to the first port, and storing the obtained second neighbor network switch configuration data in association with the second port of the first network switch.

In some embodiments, the network switch may store a configuration file that includes both the first neighbor network switch configuration data that is stored in association with the first port of the first network switch and the second neighbor network switch configuration data that is stored in association with the second port of the first network switch. As one non-limiting example, a new network switch may have multiple expansion configuration files (i.e., files for the configuration of multiple network switches) embedded in a single file using normal tags and the like. These expansion configuration files may be created by a solution architect and embedded (stored) by the new network switch in association with certain input output ports prior to the new switch being connected to another switch in the computing system. These expansion configuration files may be available for providing to additional switches that might later be connected to the new switch, such as a first configuration file for an additional switch that may be subsequently attached to a first port of the new switch and a second configuration file for an additional switch that may be subsequently attached to a second port of the new switch.

In some embodiments, the first neighbor network switch configuration data that is stored in association with the first port of the first network switch and the second neighbor network switch configuration data that is stored in association with the second port of the first network switch may be stored in the first network switch prior to installation of the first network switch. This may occur when a new computing system or expansion to an existing computing system is being commissioned.

In some embodiments, the operations may further include detecting a new neighbor network switch connection of a new neighbor network switch to a third port of the first network switch, and determining that the first network switch does not have network switch configuration data stored in association with the third port, wherein no network switch configuration data is provided to the new neighbor network switch. In this situation, the new neighbor network switch may be considered to be an expansion network switch rather than a replacement network switch, such that no previous configuration data is available for configuring the new neighbor switch.

In some embodiments, the first network switch may provide the first neighbor network switch configuration data to the first neighbor network switch using a sideband channel.

In some embodiments, neighbor network switch configuration data may include one or more configuration setting selected from a virtual local area network (VLAN) setting, a link characteristic, a channel setting and a quality of service (QoS) setting.

In some embodiments, the operations may further include receiving first neighbor network switch identifying information from the first neighbor network switch over the first neighbor network switch connection to the first port, and attempting to authenticate the first neighbor network switch using the first neighbor network switch identifying information. In one option, the first neighbor network switch configuration data that is stored in association with the first port of the first network switch may be provided to the first neighbor network switch over the first neighbor network switch connection to the first port only in response to a positive authentication of the first neighbor network switch. For example, the identifying information may identify a network switch manufacturer or vendor, and the first neighbor network switch is not authenticated unless the network switch manufacturer has an expected value. In one option, the identifying information may be a media access control (MAC) address containing a vendor string or other aspect of the MAC address that must match an expected vendor string or other aspect of the MAC address. Without limitation, the first neighbor network switch identifying information may be selected from vital product data and a media access control address. Furthermore, the embodiments may include additional security verifications other than authentication.

In some embodiments, the operations may further include receiving first neighbor network switch identifying information from the first neighbor network switch over the first neighbor network switch connection to the first port, wherein the first neighbor network switch identifying information includes vital product data, and using the vital product data from the first neighbor network switch to determine that the first neighbor network switch is compatible with the first neighbor network switch configuration data or settings. Optionally, the first neighbor network switch configuration data that is stored in association with the first port of the first network switch may be provided to the first neighbor network switch over the first neighbor network switch connection to the first port only in response to a positive determination of compatibility. For example, the vital product data (VPD) of the first neighbor network switch may include a vendor identification, model number or capacity information that the first network switch can use to determine compatibility between the first neighbor network switch and the one or more settings or configuration data that the first switch may provide to the first neighbor network switch, such as the configuration data stored in associated with the port to which the first neighbor network switch is attached. The VPD may be obtained using known protocols, such as Service Location Protocol (SLP). After confirming the appropriateness or compatibility of the first neighbor network switch described by its VPD with the first neighbor network switch configuration data, the operating system of the first network switch may upload the configuration data or send the settings commands that may form a configuration file, to the new neighbor network switch.

In some embodiments, the first network switch may obtain the vital product data (VPD) of a neighbor network switch that is attached to a port of the first network switch and may store the VPD in association with the port. If the first network switch has multiple links to neighbor switches (i.e., a link to each of multiple other neighbor network switches), the first network switch may distinguish each link by the VPD received from the corresponding neighbor network switch. Furthermore, any change in the link state with a neighbor network switch (i.e., detecting a new or different network switch attached to a port of the first network switch) may initiate one or more of the operations of obtaining, providing and storing network switch configuration data.

Some embodiments provide a network switch including a plurality of network ports including a first network port and a second network port, a non-volatile storage device storing program instructions, and a processor for processing the program instructions, wherein the program instructions are configured to, when processed by the processor, cause the processor to perform various operations. The operations may include detecting a first neighbor network switch connection to a first port of the first network switch, accessing first neighbor network switch configuration data that is stored by the first network switch in association with the first port, and providing the first neighbor network switch configuration data that is stored in association with the first port of the first network switch to the first neighbor network switch over the first neighbor network switch connection to the first port. Furthermore, the operations performed by the network switch may include any and all of the operations described herein in reference to a computer program product.

In some embodiments, an operating system running in the first network switch may be updated to cause the processor to perform some or all of the operations described herein, such as storing configuration data received from one or more other network switch to which the first network switch is connected. The configuration data that the first network switch receives from another network switch may be mapped or associated with the port on the first network switch to which the other network switch is connected. The first network switch may store a link state history in association with the configuration data received over the link (network switch to network switch link), to differentiate between a network expansion scenario and a switch replacement scenario. The "link state history" that is stored in association with the port on the first network switch may include the configuration data or file of the neighbor network switch that was connected to the port. Accordingly, if a previously attached neighbor network switch is being replaced with a new neighbor network switch that is being connected to the same port of the first switch as the previously attached neighbor switch, then the configuration data of the previously attached neighbor switch, which was previously stored by the first network switch, may be transferred from the port of the first switch to the new neighbor switch. The transfer of the configuration data or file may either be pushed by the first switch to the new neighbor network switch or pulled by the new neighbor network switch from the first switch.

The "link state history" may allow for differentiation between an expansion scenario (i.e., the new network switch is expanding the network) and a replacement scenario (i.e., the new network switch is replacing a previous network switch). For example, if the new network switch is connected to a port of the first network switch for which there is an existing neighbor network switch configuration file, then the new network switch may be considered to be a replacement network switch that will utilize the stored neighbor configuration file. Conversely, if the new network switch is connected to a port of the first network switch that does not store a neighbor configuration file, then the new network switch may be considered to be an expansion switch.

The network switch operating system may be updated with some or all of the described program instructions in order to, for example, transfer the configuration data (i.e., a file or individual settings) of the connected switches via a backchannel (also referred to as a sideband). A potential embodiment includes using VLAN 4094 as a sideband communication of the configuration data.

In some embodiments, a first network switch may be triggered to capture or update configuration data stored for a neighbor network switch in response to a configured neighbor network switch being attached to a port of the first network switch. The operating system of the first network switch may interrogate the newly attached neighbor network switch to determine whether the newly attached neighbor network switch has any discrete configuration rules or is unconfigured. A configuration file may be "captured" if the port has never before received configuration files from a connected neighbor network switch and a configuration file may be "updated" if the port receives a configuration file or one or more configuration settings that are different than the files or settings previously received. The configuration data may include any type, amount or granularity of configuration data for the neighbor network switch. For example, the configuration data may include, for each port, VLAN settings, link characteristics, channels and bonds, as well as quality of service (QoS) data.

Some embodiments provide an improvement in technology by enabling automatic network switch configuration. More specifically, embodiments may improve network switch configuration and installation. Accordingly, embodiments may save time, avoid configuration errors, reduce downtime when a network switch is being replace, and provide rapid installation of expansion network switches.

Figure 1:
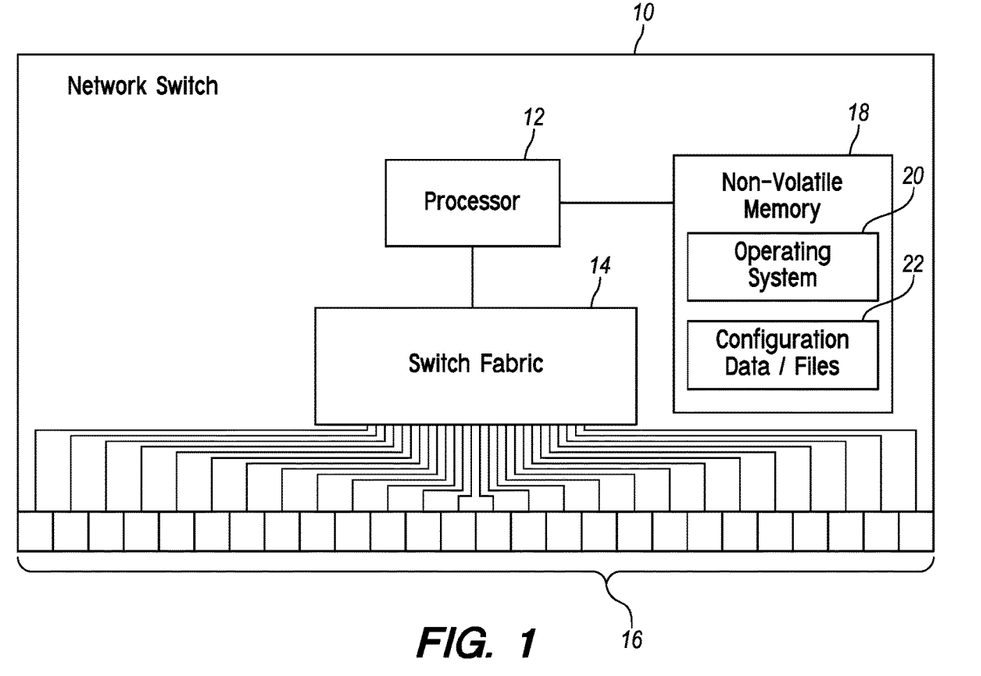
FIG. 1 is a diagram of a network switch.

FIG. 1 is a diagram of a network switch 10. The network switch 10 includes a processor 12 coupled to the switch fabric 14. The switch fabric 14 is also coupled to a set of input output ports 16, which are illustrated being distributed along a back edge of the network switch 10. The processor 12 controls the switch fabric 14 to direct messages from one port 16 to another port 16.

The processor 12 is also coupled to non-volatile memory 18 that may store an operating system 20 and configuration data or files 22. The processor 12 executes the program instructions of the operating system 20 to perform various operations of the network switch 10. For example, the operating system 20 may include the program instructions that, when executed by the processor, cause the processor to perform the operations of various embodiments described herein.

In accordance with some embodiments, the processor 12 may detect a neighbor network switch connection (not shown) to a port 16 of the network switch 10, access neighbor network switch configuration data 22 that is stored by the network switch in association with the port to which the neighbor network switch is connected, and provide the neighbor network switch configuration data 22 that is stored in association with the port to the neighbor network switch over the connection to the port 16. The processor 12 may perform various other operations described herein in accordance with one or more embodiment.

Figure 2:
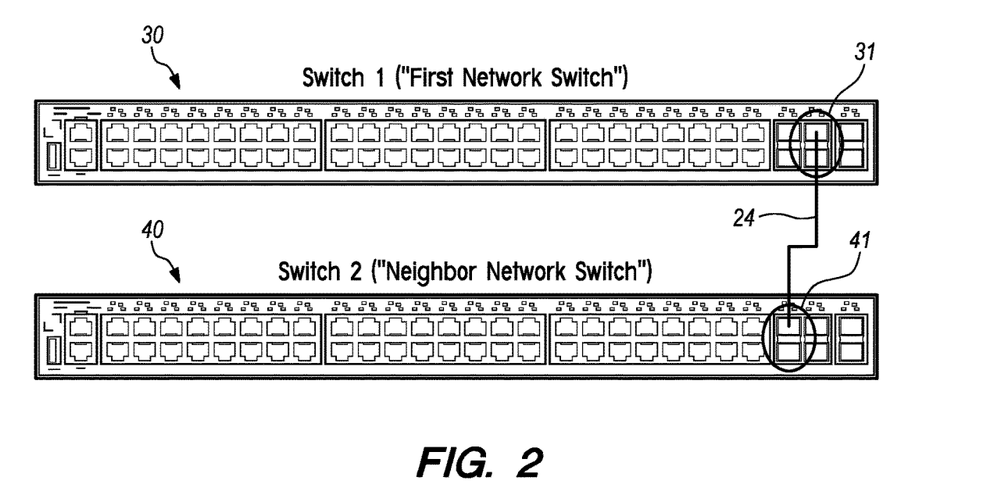
FIG. 2 is a diagram of the ports of two network switches.

FIG. 2 is a diagram of the ports of two network switches. One network switch 30 is labeled as Switch 1 and the other network switch 40 is labeled as Switch 2. The two network switches 30, 40 may be identical or different, so long as they are able to communicate using one or more common network communication standard such as Ethernet, InfiniBand. Furthermore, either or both of the network switches 30, 40 may implement one or more of the embodiments described herein. However, in FIG. 2, Switch 1 has been designated as the "first network switch" and Switch 2 has been designated as the "neighbor network switch." It should be understood that these designations merely facilitate discussion of the embodiments, and that such designations may be reversed to describe the embodiments from the perspective of the other of the two network switches.

As shown, a network cable 24 has been connected between a port 41 of the neighbor network switch 40 (Switch 2) and a port 31 of the first network switch (Switch 1) 30 to form a connection there between. The first network switch (Switch 1) 30 detects the formation of the neighbor network switch connection to the first port 31. In some embodiments, the first network switch 30 may then access neighbor network switch configuration data that is stored by the first network switch 30 in association with the first port 31, and subsequently provide the neighbor network switch configuration data that is stored in association with the first port of the first network switch to the neighbor network switch 40 over the connection (see cable 24) to the first port 31. In some embodiments, the first network switch 30 may obtain the neighbor network switch configuration data from the neighbor network switch 40 via the connection, and then store the neighbor network switch configuration data of the neighbor network switch 40 in association with the first port 31 of the first network switch 30. Having stored the configuration data of the neighbor network switch 40, should the neighbor network switch 40 be replaced with a new switch then the first network switch 30 may subsequently provide the neighbor network switch configuration data that is stored in association with the first port of the first network switch to the new neighbor network switch that is connected to the first port 31.

Figure 3:
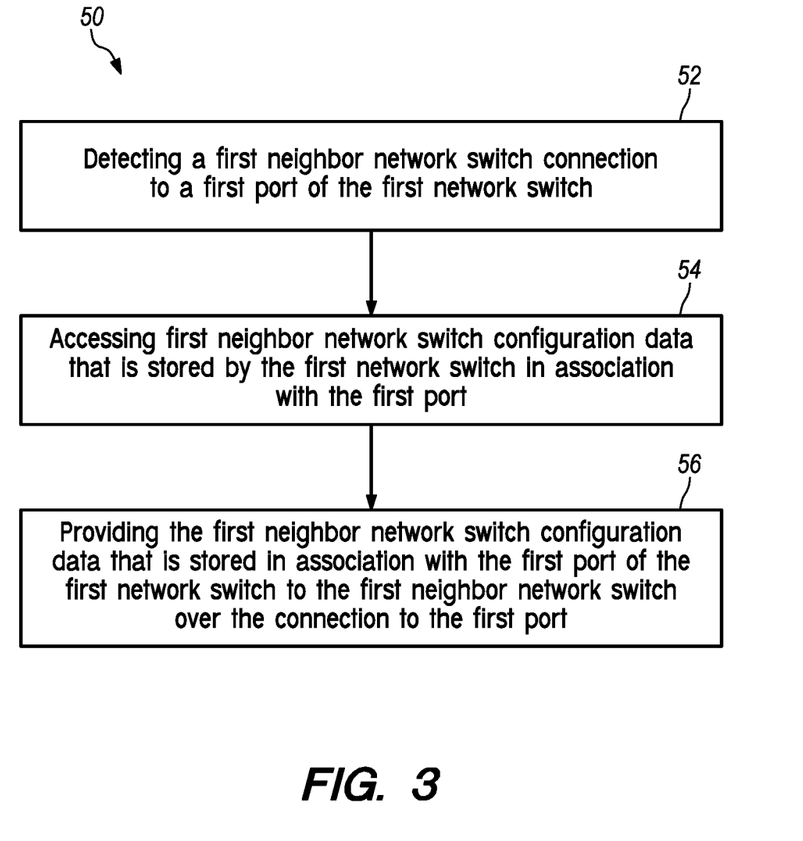
FIG. 3 is a flowchart of operations according to one embodiment.

FIG. 3 is a flowchart of 50 according to one embodiment. Operation 52 includes detecting a first neighbor network switch connection to a first port of the first network switch. Operation 54 includes accessing first neighbor network switch configuration data that is stored by the first network switch in association with the first port. Operation 56 includes providing the first neighbor network switch configuration data that is stored in association with the first port of the first network switch to the first neighbor network switch over the first neighbor network switch connection to the first port. The operations As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an electrically erasable programmable read-only memory (EEPROM), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor of a first network switch to cause the processor to perform operations comprising:
   detecting a first neighbor network switch connection of a first neighbor network switch to a first port of the first network switch;

accessing first neighbor network switch configuration data that is stored by the first network switch in association with the first port; and providing the first neighbor network switch configuration data that is stored in association with the first port of the first network switch to the first neighbor network switch over the first neighbor network switch connection to the first port.

2. The computer program product of claim 1, the operations further comprising:

causing the first neighbor network switch to be configured with the first neighbor network switch configuration data that is provided by the first network switch to the first neighbor network switch over the first neighbor network switch connection to the first port.

3. The computer program product of claim 1, the operations further comprising:

obtaining the first neighbor network switch configuration data from a second neighbor network switch that was connected to the first port of the first network switch and subsequently disconnected from the first port prior to the connection of the first neighbor network switch to the first port; and storing the obtained first neighbor network switch configuration data in association with the first port of the first network switch.

4. The computer program product of claim 3, the operations further comprising:

sending a request for the first neighbor network switch configuration data of the second neighbor network switch over the first port to the second neighbor network switch, wherein the first neighbor network switch configuration data is obtained from the second neighbor network switch in response to the request.

5. The computer program product of claim 3, wherein the first neighbor network switch is a replacement for the second neighbor network switch.

6. The computer program product of claim 1, wherein the first neighbor network switch configuration data is stored in a non-volatile memory device within the first network switch.

7. The computer program product of claim 1, the operations further comprising:

accessing first network switch configuration data describing a configuration of the first network switch; and providing the first network switch configuration data to the first neighbor network switch.

8. The computer program product of claim 7, the operations further comprising:

causing the first neighbor network switch to store the first network switch configuration data in association with a port of the first neighbor network switch that is connected to the first port of the first network switch.

9. The computer program product of claim 1, the operations further comprising:

detecting a second neighbor network switch connection of a second neighbor network switch to a second port of the first network switch;

accessing second neighbor network switch configuration data that is stored by the first network switch in association with the second port; and providing the second neighbor network switch configuration data that is stored in association with the second port to the second neighbor network switch over the connection to the second port.

10. The computer program product of claim 9, the operations further comprising:

causing the second neighbor network switch to be configured with the second neighbor network switch configuration data that is stored in association with the second port.

11. The computer program product of claim 9, wherein a configuration file stores both the first neighbor network switch configuration data that is stored in association with the first port of the first network switch and the second neighbor network switch configuration data that is stored in association with the second port of the first network switch.

12. The computer program product of claim 9, wherein the first neighbor network switch configuration data that is stored in association with the first port of the first network switch and the second neighbor network switch configuration data that is stored in association with the second port of the first network switch are stored in the first network switch prior to installation of the first network switch.

13. The computer program product of claim 9, the operations further comprising:

obtaining the first neighbor network switch configuration data from a third neighbor network switch that was connected to the first port of the first network switch and subsequently disconnected from the first port prior to the connection of the first neighbor network switch to the first port;

storing the obtained first neighbor network switch configuration data in association with the first port of the first network switch;

obtaining the second neighbor network switch configuration data from a fourth neighbor network switch that was connected to the second port of the first network switch and subsequently disconnected from the second port prior to the connection of the second neighbor network switch to the first port; and storing the obtained second neighbor network switch configuration data in association with the second port of the first network switch.

14. The computer program product of claim 1, the operations further comprising:

detecting a new neighbor network switch connection of a new neighbor network switch to a third port of the first network switch; and determining that the first network switch does not have network switch configuration data stored in association with the third port, wherein no network switch configuration data is provided to the new neighbor network switch.

15. The computer program product of claim 1, wherein the first network switch provides the first neighbor network switch configuration data to the first neighbor network switch using a sideband channel.

16. The computer program product of claim 1, wherein the first neighbor network switch configuration data includes one or more configuration setting selected from a virtual local area network (VLAN) setting, a link characteristic, a channel setting and a quality of service (QoS) setting.

17. The computer program product of claim 1, the operations further comprising:

receiving first neighbor network switch identifying information from the first neighbor network switch over the first neighbor network switch connection to the first port; and attempting to authenticate the first neighbor network switch using the first neighbor network switch identifying information, wherein the first neighbor network switch configuration data that is stored in association with the first port of the first network switch is provided to the first neighbor network switch over the first neighbor network switch connection to the first port only in response to a positive authentication of the first neighbor network switch.

18. The computer program product of claim 17, wherein the first neighbor network switch identifying information is selected from vital product data and a media access control address.

19. A computer program product comprising a non-volatile computer readable medium and non-transitory program instructions embodied therein, the program instructions being configured to be executable by a processor of a first network switch to cause the processor to perform operations comprising:
   detecting a first neighbor network switch connection of a first neighbor network switch to a first port of the first network switch;
   accessing first neighbor network switch configuration data that is stored by the first network switch in association with the first port;
   providing the first neighbor network switch configuration data that is stored in association with the first port of the first network switch to the first neighbor network switch over the first neighbor network switch connection to the first port;
   receiving first neighbor network switch identifying information from the first neighbor network switch over the first neighbor network switch connection to the first port, wherein the first neighbor network switch identifying information includes vital product data; and
   using the vital product data from the first neighbor network switch to determine that the first neighbor network switch is compatible with the first neighbor network switch configuration data, wherein the first neighbor network switch configuration data that is stored in association with the first port of the first network switch is provided to the first neighbor network switch over the first neighbor network switch connection to the first port only in response to a positive authentication of the first neighbor network switch.

20. A network switch, comprising:
   a plurality of network ports including a first network port and a second network port;
   a non-volatile storage device storing program instructions; and
   a processor for processing the program instructions, wherein the program instructions are configured to, when processed by the processor, cause the processor to perform operations comprising:
   detecting a first neighbor network switch connection to a first port of the first network switch;
   accessing first neighbor network switch configuration data that is stored by the first network switch in association with the first port; and
   providing the first neighbor network switch configuration data that is stored in association with the first port of the first network switch to the first neighbor network switch over the first neighbor network switch connection to the first port.

* * * * *